United States Patent
Jierian et al.

(10) Patent No.: US 12,371,105 B2
(45) Date of Patent: Jul. 29, 2025

(54) AIR EXTRACTOR FOR VEHICLE COMPARTMENT

(71) Applicant: Rivian IP Holdings, LLC, Plymouth, MI (US)

(72) Inventors: Danny Jierian, Diamond Bar, CA (US); Graham Lloyd Feltham, Irvine, CA (US)

(73) Assignee: Rivian IP Holdings, LLC

( * ) Notice: Subject to any disclaimer, the term of this patent is extended or adjusted under 35 U.S.C. 154(b) by 431 days.

(21) Appl. No.: 17/937,873

(22) Filed: Oct. 4, 2022

(65) Prior Publication Data

US 2024/0109602 A1    Apr. 4, 2024

(51) Int. Cl.
*B62D 25/24*    (2006.01)
*B60H 1/24*    (2006.01)
*B62D 43/10*    (2006.01)

(52) U.S. Cl.
CPC ............. *B62D 25/24* (2013.01); *B60H 1/249* (2013.01); *B62D 43/10* (2013.01)

(58) Field of Classification Search
CPC ......... B62D 25/24; B62D 43/10; B60H 1/249
USPC .......................................................... 454/70
See application file for complete search history.

(56) References Cited

U.S. PATENT DOCUMENTS

| 2005/0057062 A1* | 3/2005 | McClure ................. B60R 13/01 |
| | | 296/37.6 |
| 2009/0241888 A1* | 10/2009 | Koss ................... F02M 35/1261 |
| | | 181/204 |
| 2010/0026019 A1* | 2/2010 | Couto ..................... B60R 19/48 |
| | | 292/179 |
| 2015/0102038 A1* | 4/2015 | Anderson ............ B60K 15/073 |
| | | 220/562 |
| 2018/0015959 A1* | 1/2018 | Metcalf ................. B62D 25/12 |
| 2020/0269652 A1* | 8/2020 | Gallagher .............. B60H 1/244 |
| 2021/0170860 A1* | 6/2021 | Ciccone ................. F02M 35/16 |

FOREIGN PATENT DOCUMENTS

DE    102006020668 A1 * 11/2007 ............. B60H 1/249

* cited by examiner

*Primary Examiner* — Allen R. B. Schult
*Assistant Examiner* — William C Weinert
(74) *Attorney, Agent, or Firm* — FOLEY & LARDNER LLP

(57) ABSTRACT

An apparatus that can include a vehicle compartment with a passage for air extraction is disclosed. The vehicle compartment can define an interior volume of a vehicle. The vehicle compartment can enclose the interior volume from an external environment. The apparatus can include a snorkel. The snorkel can be in fluid communication with the interior volume of the vehicle compartment. The snorkel can be in fluid communication with the external environment. The snorkel can be integrated into a truck bed of the vehicle. The truck bed of the vehicle can define a side wall space of the vehicle. The snorkel can be in fluid communication with the side wall space of the truck bed.

18 Claims, 7 Drawing Sheets

AIR EXTRACTOR FOR VEHICLE COMPARTMENT

INTRODUCTION

Vehicles can include compartments. The storage of items can depend on characteristics of the compartments.

SUMMARY

The present disclosure is directed towards providing an apparatus such as a storage compartment apparatus for a vehicle. The apparatus can be or can include a vehicle compartment. The vehicle compartment can define an interior volume, which can be enclosed completely or partially from the outside environment. Closing the vehicle compartment can be a challenge since the outflow of air from the vehicle compartment can be restricted or prevented. Closing the vehicle compartment can also cause the interior volume of the vehicle compartment to pressurize since air cannot exit at a sufficient volume or flow rate. The vehicle compartment described herein can include or can be fluidly coupled with a passageway such as a snorkel. The snorkel can provide for air extraction from the interior volume of the vehicle compartment so that the vehicle compartment does not pressurize. For example, the vehicle compartment can be below a water line of the outside environment with the vehicle compartment submerged in water, and the interior volume of the vehicle compartment can be enclosed such that the water does not enter the interior volume of the vehicle compartment. The snorkel can include an egress air channel which can provide a path for air located in the interior volume of the vehicle compartment to exit. For example, the snorkel can include a first end, also referred to as an inlet, in fluid communication with the interior volume of the vehicle compartment, and a second end, also referred to as an outlet. Air from the interior volume of the vehicle compartment can enter the first end of the snorkel, travel through the egress air channel of the snorkel, and exit through the second end of the snorkel. The second end (e.g., outlet) of the snorkel can be positioned above the water line of the vehicle.

At least one aspect is directed to an apparatus. The apparatus can include a vehicle compartment. The vehicle compartment can define an interior volume of a vehicle. The vehicle compartment can enclose the interior volume from an external environment. The apparatus can include a snorkel. The snorkel can be in fluid communication with the interior volume of the vehicle compartment. The snorkel can be in fluid communication with the external environment. The snorkel can be integrated into a truck bed of the vehicle. The truck bed of the vehicle can define a side wall space of the vehicle. The snorkel can be in fluid communication with the side wall space of the truck bed.

At least one aspect is directed to a vehicle. The vehicle can include a vehicle compartment. The vehicle compartment can define an interior volume of the vehicle. The vehicle compartment can enclose the interior volume from an external environment. The vehicle can include a snorkel. The snorkel can be in fluid communication with the interior volume of the vehicle compartment. The snorkel can be in fluid communication with the external environment. The snorkel can be integrated into a truck bed of the vehicle. The truck bed of the vehicle can define a side wall space of the vehicle. The snorkel can be in fluid communication with the side wall space of the truck bed.

At least one aspect is directed to a method. The method can include providing a vehicle compartment. The vehicle compartment can define an interior volume of the vehicle. The method can include enclosing the interior volume of the vehicle compartment from an external environment. The method can include coupling a snorkel with the vehicle compartment. The snorkel can be in fluid communication with the interior volume of the vehicle compartment. The snorkel can be in fluid communication with the external environment. The method can include integrating the snorkel into a truck bed of the vehicle. The truck of the vehicle can define a side wall space of the vehicle. The snorkel can be in fluid communication with the side wall space of the truck bed.

At least one aspect is directed to a method. The method can include providing a vehicle. The vehicle can include a vehicle compartment. The vehicle compartment can define an interior volume of the vehicle. The vehicle compartment can enclose the interior volume from an external environment. The vehicle can include a snorkel. The snorkel can be in fluid communication with the interior volume of the vehicle compartment. The snorkel can be in fluid communication with the external environment. The snorkel can be integrated into a truck bed of the vehicle. The truck bed of the vehicle can define a side wall space of the vehicle. The snorkel can be in fluid communication with the side wall space of the truck bed.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
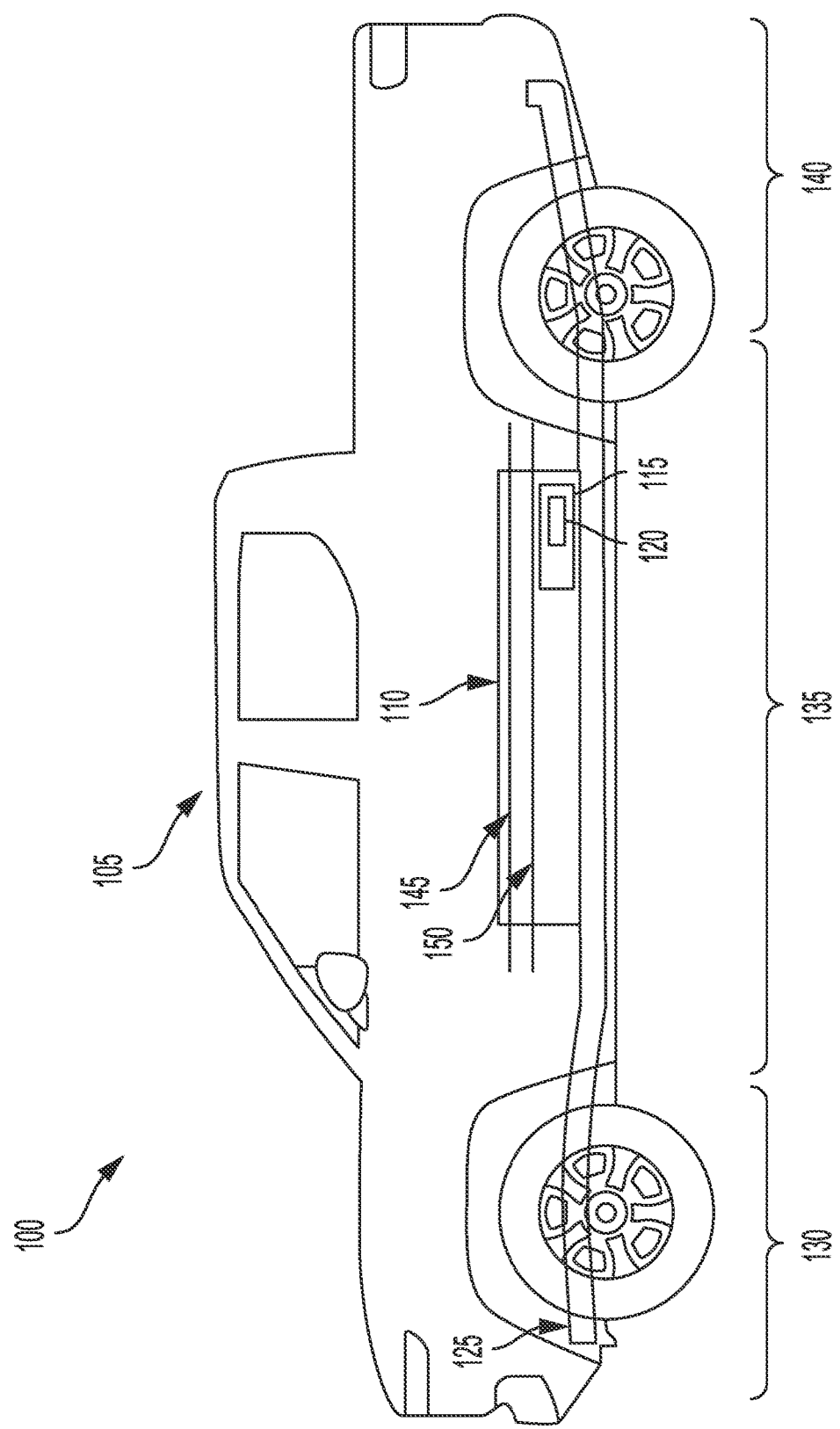
FIG. 1 depicts a side view of a vehicle, according to an exemplary embodiment.

Following below are more detailed descriptions of various concepts related to, and implementations of, methods, apparatuses, and systems of a vehicle compartment. The various concepts introduced above and discussed in greater detail below may be implemented in any of numerous ways.

This disclosure is generally directed to an apparatus such as a storage compartment apparatus of a vehicle that can store items. Vehicles can travel in changing environments. For example, a vehicle can be exposed to a dry dirt road, a muddy shoreline of a lake or ocean, or a body of water. Systems and components of a vehicle can change with use of the vehicle in changing environments such that optimum performance of the components of the vehicle or the vehicle can be hindered. For example, the components of the vehicle can be exposed to a fluid or other environmental elements such that the properties of the component or the items stored within the component change with use of the vehicle. Such changes of the components of the vehicle can lead to changes to the systems within the vehicle, hindering the performance of the vehicle or the systems within the vehicle.

Systems and methods of the present technical solution can provide an apparatus that can open and close and store an item. The apparatus can include a vehicle compartment. For example, the apparatus can include or can be a storage compartment apparatus for a vehicle. It can be beneficial to store items, such as a tire, in a vehicle compartment because the vehicle compartment can enclose the items from the external, or outside, environment. The vehicle compartment can define an interior volume, which can be enclosed completely or partially from the outside environment. For example, the interior volume of the vehicle compartment can be enclosed from an outside environment, e.g., water, such that the water does not enter the interior volume. Closing the vehicle compartment can be a challenge since the outflow of air from the vehicle compartment can be restricted or prevented. Closing the vehicle compartment can also cause the interior volume of the vehicle compartment to pressurize since air cannot exit at a sufficient volume or flow rate.

The disclosed solutions have a technical advantage of closing the apparatus with a threshold force such that the interior volume of the apparatus is sealed from the outside environment. The vehicle compartment described herein can include or can be fluidly coupled with a passageway such as a snorkel. The snorkel can provide for air extraction from the interior volume of the vehicle compartment so that the vehicle compartment does not pressurize. For example, the vehicle compartment can be below a water line of the outside environment with the vehicle compartment submerged in water, and the interior volume of the vehicle compartment can be enclosed such that the water does not enter the interior volume of the vehicle compartment. The snorkel can include an egress air channel which can provide a path for air located in the interior volume of the vehicle compartment to exit. For example, the snorkel can include a first end, also referred to as an inlet, in fluid communication with the interior volume of the vehicle compartment, and a second end, also referred to as an outlet. Air from the interior volume of the vehicle compartment can enter the first end of the snorkel, travel through the egress air channel of the snorkel, and exit through the second end of the snorkel. The second end (e.g., outlet) of the snorkel can be positioned above the water line of the vehicle.

FIG. 1 depicts an example cross-sectional view 100 of a vehicle 105. The vehicle 105 can be an electric vehicle installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2:
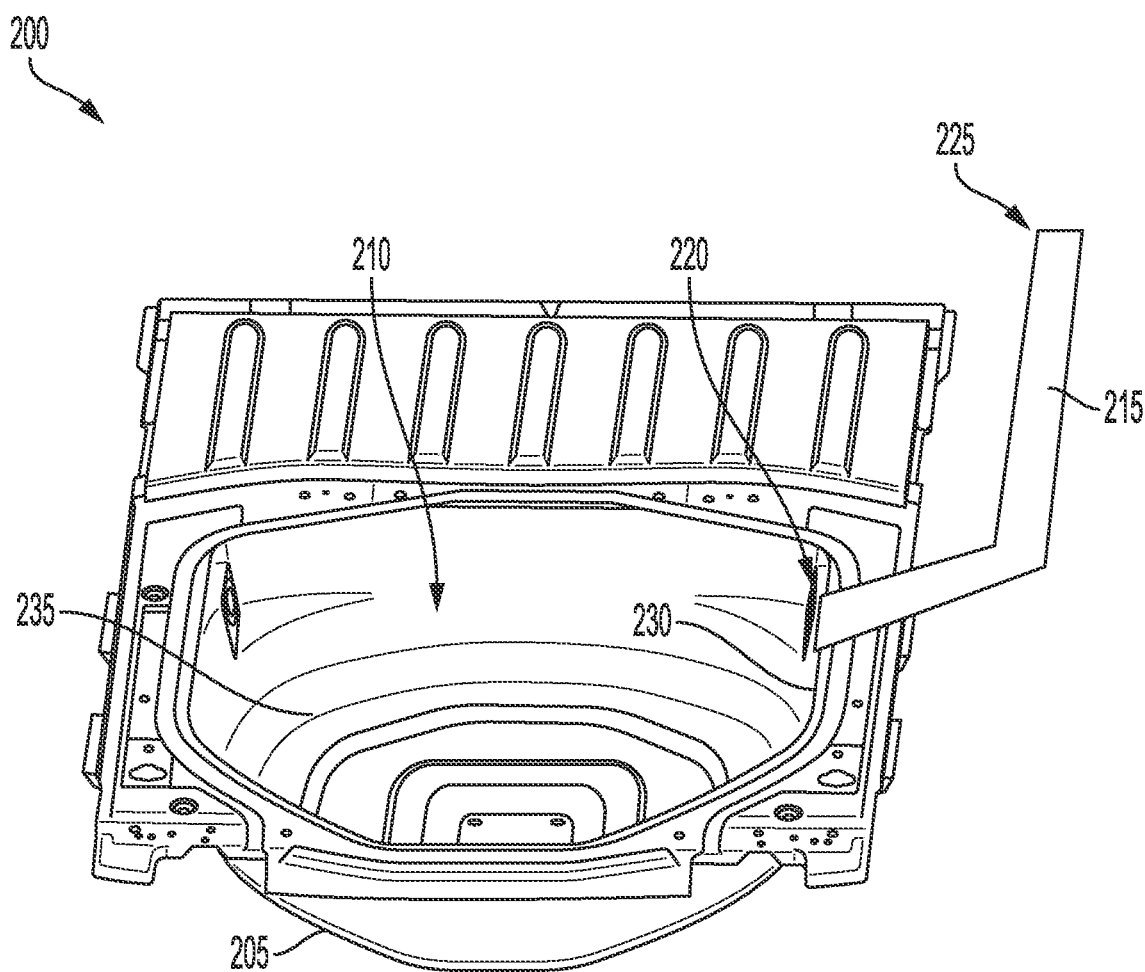
FIG. 2 depicts a perspective view of an apparatus, according to an exemplary embodiment.

FIG. 2 depicts a perspective view of an apparatus 200. The apparatus can include at least one vehicle compartment 205. For example, the vehicle compartment 205 can receive and store items, such as a tire. The vehicle compartment 205 can define at least one interior volume 210 of the electric vehicle 105. The vehicle 105 does not have to be electric. For example, the vehicle compartment 205 can define at least one interior volume 210 of a gas powered, hybrid, hydrogen, or otherwise powered, vehicle. The interior volume 210 of the vehicle compartment 205 can include a first pressure. The vehicle compartment 205 can enclose the interior volume 210 from an external environment. For example, the vehicle compartment 205 can enclose the interior volume 210 from a fluid, such as water. For example, the vehicle compartment 205 can enclose the interior volume 210 from a substance, such as dirt and mud. The first pressure of the interior volume 210 of the vehicle compartment 205 can be greater than the pressure of the outside environment. The enclosure of the interior volume 210 of the vehicle compartment 205 can be airtight, but does not have to be an airtight enclosure. For example, the interior volume 210 of the vehicle compartment 205 can but does not have to be vacuum sealed.

The vehicle compartment 205 can include at least one interior wall 230. For example, the interior wall 230 can partially or completely define the interior volume 210. The interior wall 230 can be made of a combination of acetal (also known as polyacetal or polyoxymethylene (POM)), aluminum, or a combination of acetal and aluminum. The interior wall 230 can be made of another material or combination of materials. The vehicle compartment 205 can include at least one contour 235. For example, the interior wall 230 can include the contours 235. The contours 235 can receive the tire. For example, the contours 235 can be or can include protrusions that resemble the shape and size of the tire such that the tire is supported by the contours 235.

The apparatus can include at least one passageway 215. The passageway 215 can be or include a conduit or pathway for the flow of a fluid such as air, e.g., exhausted from the vehicle compartment 205. The passageway 215 can be referred to herein as a snorkel 215. The vehicle compartment 205 can include the snorkel 215. For example, the snorkel 215 can be coupled with the vehicle compartment 205. The snorkel 215 can be an integral element of the vehicle compartment 205. For example the snorkel 215 can be built into other vehicle components (e.g., a wall or panel) such that at least part of the snorkel 215 is not visible from an external inspection of the vehicle. The snorkel 215 can be in fluid communication with the interior volume 210 of the vehicle compartment 205. The snorkel 215 can be in fluid communication with the external environment. For example, the snorkel 215 can be a passageway for a fluid, e.g., air, located in the interior volume 210 to flow through to the external environment. The snorkel 215 can define an outer diameter greater than or equal to about 85 millimeters and less than or equal to about 95 millimeters. For example, the outer diameter of the snorkel 215 can be 85 millimeters.

The snorkel 215 can include at least one first end 220, e.g., an inlet. The first end 220 can be fluidly coupled with the interior wall 230 of the vehicle compartment 205. For example, the first end 220 can be in fluid communication with the interior volume 210 of the vehicle compartment 205 via the coupling with the interior wall 230. For example, the first end 220 can be fluidly coupled with the interior wall 230 such that the first end 220 and the interior wall 230 are in fluid communication with each other. The snorkel 215 can be flush with the interior wall 230 of the vehicle compartment 205. For example, the first end 220 of the snorkel 215 can be flush with the interior wall 230 such that the snorkel 215 does not have to protrude into the interior volume 210 of the vehicle compartment.

The snorkel 215 can include at least one second end 225, e.g., an outlet. For example, the snorkel 215 can be a tubular structure with two ends 220, 225. The second end 225 of the snorkel 215 can be in fluid communication with the external environment. For example, the second end 225 of the snorkel 215 can be exposed to the external environment. The fluid, e.g., air, in the interior volume 210 can flow into the first end 220, e.g., the inlet, of the snorkel 215, out of the second end 225, e.g., the outlet, of the snorkel 215, and into the external environment. The external environment can include a second pressure. The second pressure of the external environment can be the same as the first pressure of the interior volume 210. The second pressure of the external environment can be less than the first pressure of the interior volume 210. For example, the second pressure of the external environment can be opposite from the first pressure of the interior volume 210.

Figure 3:
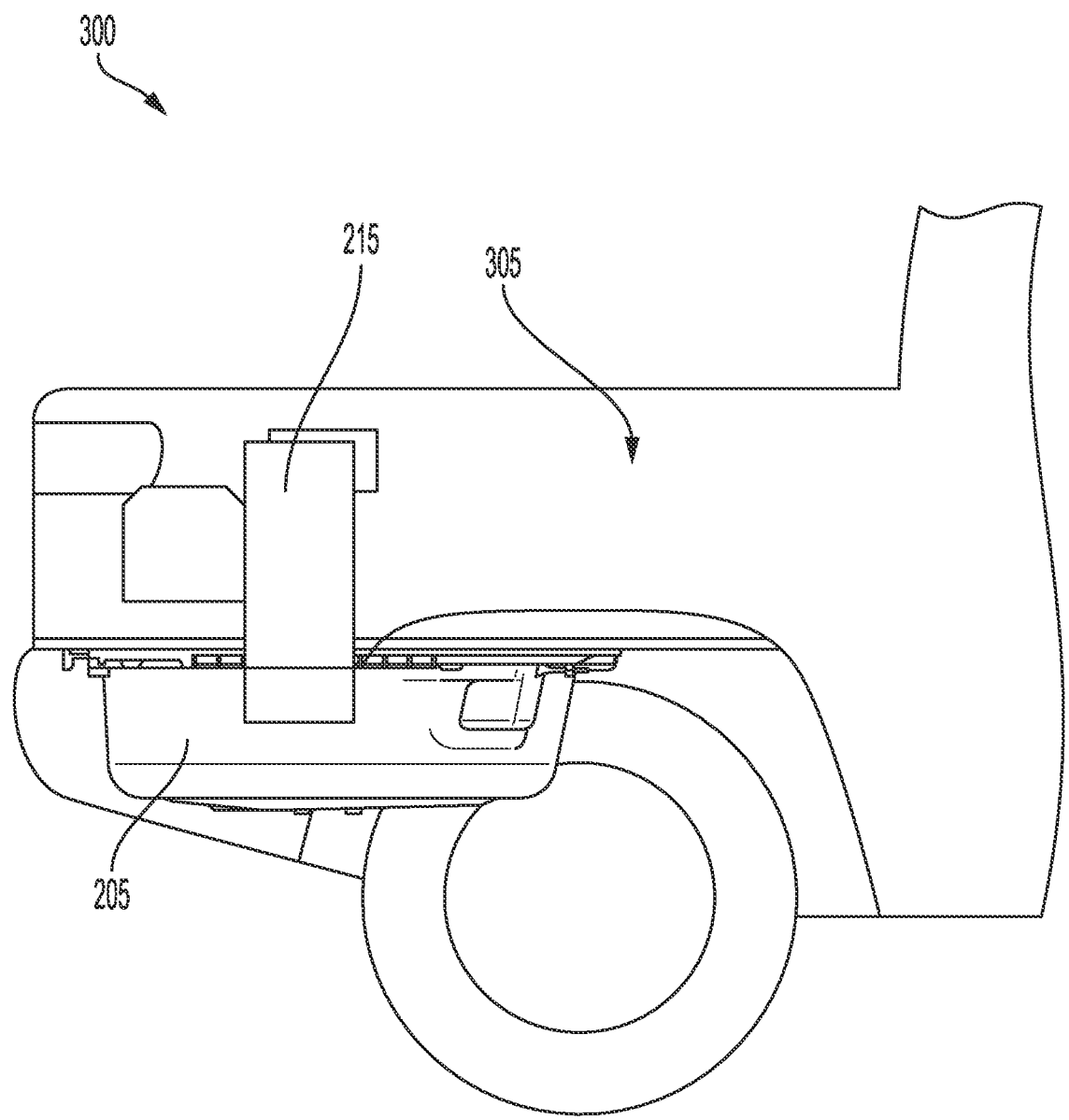
FIG. 3 depicts a cross sectional side view of the vehicle and the apparatus, according to an exemplary embodiment.

FIG. 3 depicts a cross sectional side view 300 of the vehicle 105 and the apparatus 200. The vehicle 105 can include at least one body 305. The body 305 can include one or more of the front portion 130, the body portion 135, or the rear portion 140. For example, the body 305 can be a trunk, a truck bed, a car hood, or another portion of the vehicle 105. For example the body 305 is depicted as a truck bed in FIG. 3, among others. The snorkel 215 can be integrated into the body 305 of the vehicle 105. The body 305 of the vehicle 105 can define at least one space 310. The space 310 can be referred to herein as a side wall space 310. The side wall space 310 can include a pressure. The pressure of the side wall space 310 can be approximately (e.g., +/−10%) the same as the second pressure of the external environment. For example, the pressure of the side wall space 310 can be less than the first pressure of the interior volume 210.

The snorkel 215 can be fluidly coupled with the body 305 of the vehicle 105. For example, the snorkel 215 can be fluidly coupled with the body 305 such that the snorkel 215 is in fluid communication with the side wall space 310 of the body 305 of the vehicle 105. The second end 225 of the snorkel 215 can be in fluid communication with the side wall space 310 of the body 305, e.g., the truck bed. The snorkel 215 can be an integral element of the body 305 of the vehicle 105. For example, the snorkel 215 can be integrated into the body 305, e.g., the truck bed, of the vehicle 105. The snorkel 215 can be flush with the side wall space 310 of the body 305 of the vehicle 105. For example, the second end 225 of the snorkel 215 can be flush with the side wall space 310 of the body 305 of the vehicle 105 such that the snorkel 215 does not have to protrude into the side wall space 310 of the body 305.

Figure 4:
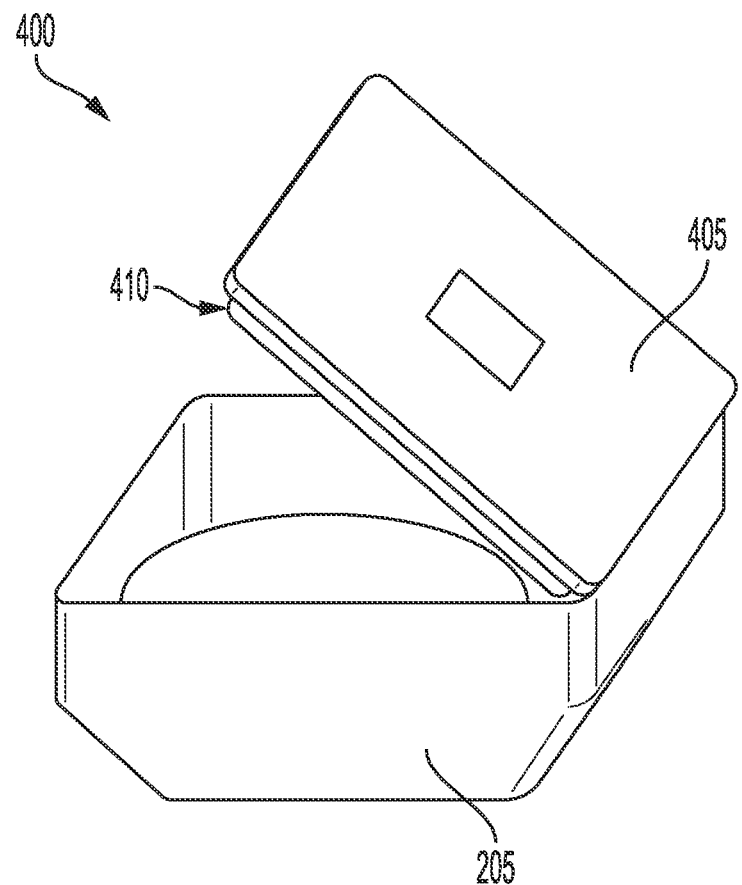
FIG. 4 depicts a perspective view of a vehicle compartment in a first position, according to an exemplary embodiment.
Figure 5:
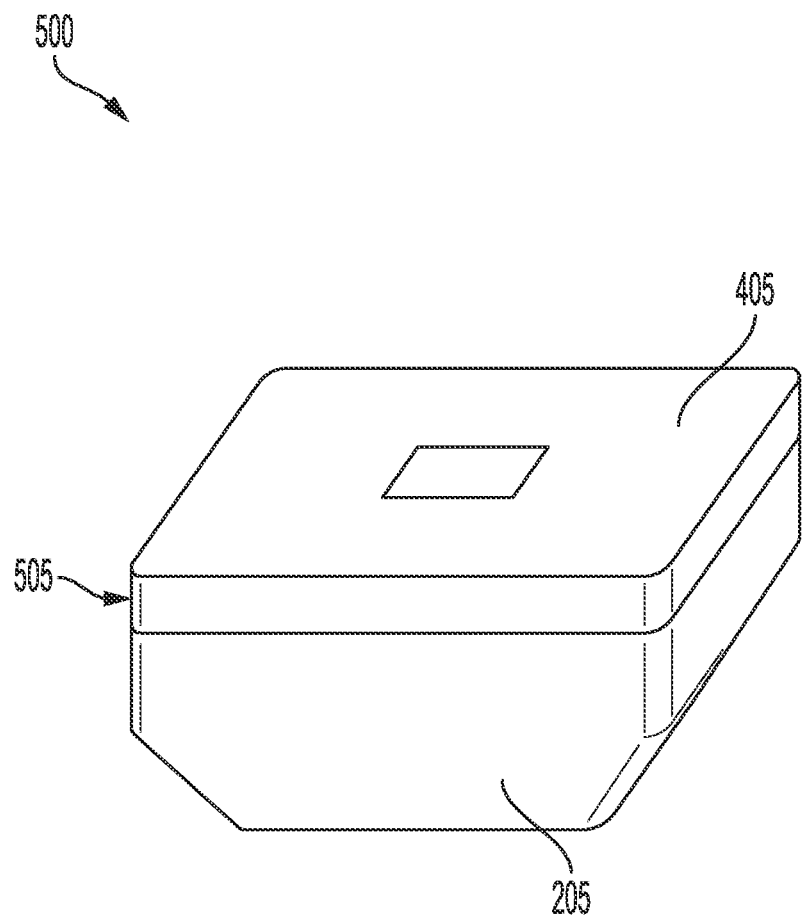
FIG. 5 depicts a perspective view of a vehicle compartment in a second position, according to an exemplary embodiment.

FIGS. 4 and 5 depict perspective views 400, 500 of the vehicle compartment 205. FIG. 4 depicts a perspective view 400 of the vehicle compartment 205 in a first position 410. FIG. 5 depicts a perspective view 500 of the vehicle compartment 205 in a second position 505. The vehicle compartment 205 can include at least one door 405. The door 405 of the vehicle compartment 205 can be located anywhere on the vehicle compartment 205. For example, the door 405 can be positioned, disposed at, and located on a side, a top, and on a bottom (in an operational orientation of the vehicle compartment 205) of the vehicle compartment 205. For example, the door 405 is shown to be located on the top (in an operational orientation of the vehicle compartment 205) of the vehicle compartment 205 in FIGS. 4 and 5, among others.

The vehicle compartment 205 can define at least one first position 410. For example, the first position 410 of the vehicle compartment 205 can be defined as the door 405 in an open position. For example, with the vehicle compartment 205 in the first position 410, the interior volume 210 of the vehicle compartment 205 can be exposed to the external environment. For example, with the vehicle compartment 205 in the first position 410, the first pressure of the interior volume 210 of the vehicle compartment 205 can be the same as the second pressure of the external environment. With the vehicle compartment 205 in the first position 410, items, e.g., the tire, can be received by the vehicle compartment 205. For example, with the vehicle compartment 205 in the first position 410, the tire can be received by the contours 235 of the vehicle compartment 205.

The vehicle compartment 205 can define at least one second position 505. For example, the second position 505 of the vehicle compartment 205 can be defined as the door 405 in a closed position. For example, with the vehicle compartment 205 in the second position 505, the interior volume 210 of the vehicle compartment 205 can be enclosed from the external environment. For example, with the vehicle compartment 205 in the second position 505, the first pressure of the interior volume 210 of the vehicle compartment 205 can be greater than or the same as the second pressure of the external environment. With the vehicle compartment 205 in the second position 505, items, e.g., the tire, can be stored within the vehicle compartment 205. For example, with the vehicle compartment 205 in the second position 505, the tire can be stored in the interior volume 210 of the vehicle compartment 205.

The door 405 can include at least one handle 415. The handle 415 can include at least one button, lever, or actuator.

For example, the handle 415 can be used to actuate the door 405. For example, the door 405 can actuate between the first position 410 and the second position 505. For example, the handle 415 can actuate the door 405 between the first position 410 and the second position 505. The snorkel 215 can extract the fluid, e.g., air, from the interior volume 210 of the vehicle compartment 205 responsive to the door 405 actuating from the first position 410 to the second position 505. For example, upon actuation of the door 405 from the first position 410 to the second position 505, fluid, e.g., air, can flow from the interior volume 210 through the first end 220, e.g., the inlet, of the snorkel 215, through the second end 225, e.g., the outlet, of the snorkel 215, into the external environment, e.g., the side wall space 310 of the body 305 of the vehicle 105, or into the atmosphere external to the vehicle 105.

Figure 6:
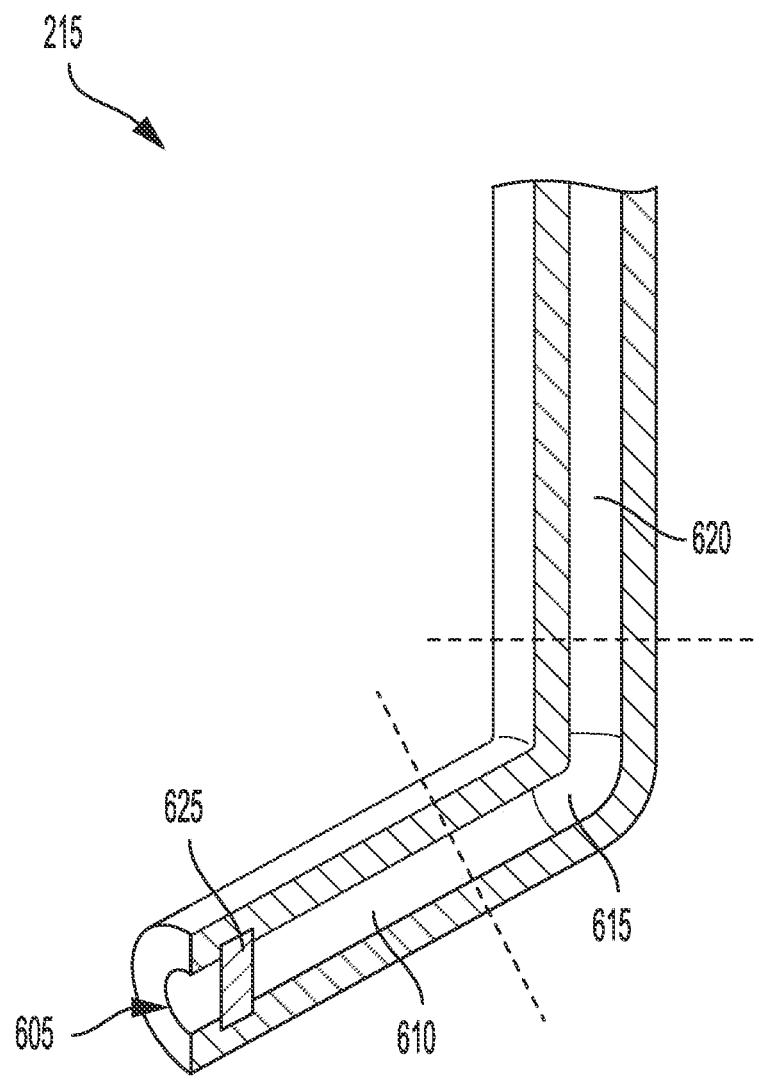
FIG. 6 depicts a cross sectional view of a snorkel, according to an exemplary embodiment.

FIG. 6 depicts a cross sectional view of the snorkel 215. The snorkel 215 can be a hollow structure, e.g., a tube. The fluid pathway through the snorkel 215 (e.g., the tube) can be symmetrical, asymmetrical, cylindrical, rectangular. The tube can be of a uniform or non-uniform diameter (or cross-sectional distance). For example, one end or one portion of the tube can be larger in cross-sectional distance than another end or another portion of the tube. The snorkel 215 can include at least one egress air channel 605. The egress air channel 605 can define an inner diameter of the snorkel 215. For example, the diameter of the egress air channel 605 can be greater than 80 millimeters and less than 90 millimeters. The diameter of the egress air channel 605 can be any distance sufficient to allow fluid from the interior volume 210 to flow through the snorkel 215 at a rate such that the interior volume 210 of the vehicle compartment 205 does not pressurize. For example, the diameter of the egress air channel 605 can be variable such that it is not uniform throughout the snorkel 215. The diameter of the egress air channel 605 can be uniform throughout the snorkel 215.

The egress air channel 605 can define at least one first opening 630 and at least one second opening 635. The first end 220, e.g., the inlet, of the snorkel 215 can define the first opening 630. For example, the fluid in the interior volume 210 can flow through the first opening 630 of the first end 220. The second end 225, e.g., the outlet, of the snorkel 215 can define the second opening 635. The fluid in the interior volume 210 can flow through the first opening 630 of the first end 220 and through the second opening 635 of the second end 225 of the snorkel to the outside environment. The diameter of the first opening 630 and the diameter of the second opening 635 can be the same. For example, the diameter of the first opening 630 and the diameter of the second opening 635 can be the same as the diameter of the egress air channel 605 with the egress air channel 605. The diameter of the first opening 630 and the diameter of the second opening 635 can be different. For example, the diameter of the first opening 630 can be less than or greater than the diameter of the second opening 635.

The egress air channel 605 can include one of at least one first portion 610, at least one second portion 615, and at least one straight egress portion 620. The egress air channel 605 does not need to include the first portion 610, the second portion 615, or the straight egress portion 620. For example, the egress air channel 605 can include only the straight egress portion 620. For example, the egress air channel 605 can include only the first portion 610. For example, the egress air channel 605 can include only the second portion 615. The portions 610, 615 can be straight or curved. The diameter of the egress air channel 605 can be uniform such that the diameters of the portions 610, 615, 620 are the same.

The diameter of the egress air channel 605 can be variable such that the diameters of the portions 610, 615, 620 are different. For example, the diameter of the first portion 610 can be less than or greater than the diameter of the straight egress portion 620.

The first portion 610 can be in fluid communication with a second portion 615. For example, the fluid in the interior volume 210 can flow into the first opening 630 of the first end 220 of the snorkel to the first portion 610 and then to the second portion 615. The second portion 615 can be in fluid communication with the straight egress portion 620. For example, the fluid in the interior volume 210 can flow into the first opening 630 of the first end 220 of the snorkel 215 to the first portion 610 and then to the second portion 615 of the egress air channel 605 to the straight egress portion 620. The straight egress portion 620 can be in fluid communication with the second opening 635 of the second end 225 of the snorkel 215. For example, the fluid in the interior volume 210 can flow into the first opening 630 of the first end 220 of the snorkel, to the first portion 610, to the second portion 615, to the straight egress portion 620, to the second opening 635 of the second end 225 of the snorkel 215, and to the external environment.

The snorkel 215 can include at least one valve 625. The valve 625 can be a one-way pressure valve. The valve 625 can be referred to herein as a one-way pressure valve 625. The egress air channel 605 can include the one-way pressure valve 625. The one-way pressure valve 625 can allow unidirectional fluid flow from the vehicle compartment 205 to the external environment. For example, the one-way pressure valve 625 can restrict fluid flow from the external environment into the vehicle compartment 205. For example, the one-way pressure valve 625 can allow fluid flow from the interior volume 210 of the vehicle compartment 205, through the snorkel 215, and to the external environment. The one-way pressure valve 625 can be positioned, disposed at, and located anywhere in the snorkel 215. For example, the one-way pressure valve 625 can be positioned in the first portion 610, the second portion 615, and the straight egress portion 620. For example, the one-way pressure valve 625 is shown to be positioned in the first portion 610 of the egress air channel 605 in FIG. 6, among others.

Figure 7:
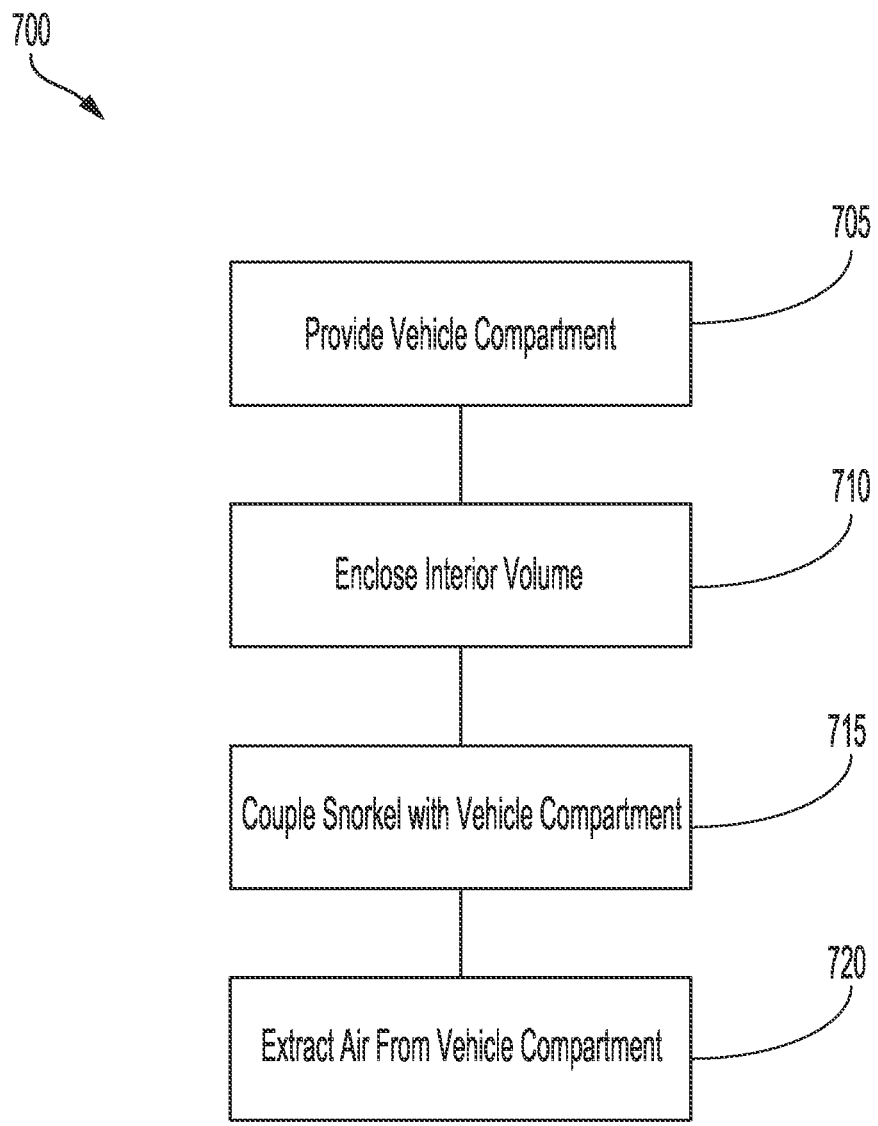
FIG. 7 depicts a flow diagram illustrating a method, according to an exemplary embodiment.

FIG. 7 depicts a flow diagram illustrating a method 700. Method 700 can include providing a vehicle compartment 205 (ACT 705). For example, the vehicle compartment 205 can receive and store items, such as a tire. The vehicle compartment 205 can define at least one interior volume 210 of the vehicle 105. The interior volume 210 of the vehicle compartment 205 can include a first pressure.

Method 700 can include enclosing the interior volume 210 of the vehicle compartment 205 from the external environment (ACT 710). For example, the interior volume 210 can be enclosed from a fluid, such as water, and from a substance such as dirt and mud. The first pressure of the interior volume 210 of the vehicle compartment 205 can be greater than the pressure of the outside environment. The enclosure of the interior volume 210 of the vehicle compartment 205 does not have to be an airtight enclosure. For example, the interior volume 210 of the vehicle compartment 205 does not have to be vacuum sealed.

Method 700 can include coupling or integrating a snorkel 215 with the vehicle compartment 205 (ACT 715). The snorkel 215 can be in fluid communication with the interior volume 210 of the vehicle compartment 205. The snorkel 215 can be in fluid communication with the external environment. For example, the snorkel 215 can be a passageway for a fluid, e.g., air, located in the interior volume 210 to flow through to the external environment. The snorkel 215 can define an outer diameter greater than or equal to about 85 millimeters and less than or equal to about 95 millimeters. For example, the outer diameter of the snorkel 215 can be 85 millimeters.

Method 700 can include extracting air from the interior volume 210 of the vehicle compartment 205 via the snorkel 215 (ACT 720). For example, the door 405 of the vehicle compartment 205 can be located anywhere on the vehicle compartment 205 and can actuate between the first position 410 and the second position 505. The snorkel 215 can extract the fluid, e.g., air, from the interior volume 210 of the vehicle compartment 205 responsive to the door 405 actuating from the first position 410 to the second position 505. For example, upon actuation of the door 405 from the first position 410 to the second position 505, fluid, e.g., air, can flow from the interior volume 210 through the first end 220, e.g., the inlet, of the snorkel 215, through the second end 225, e.g., the outlet, of the snorkel 215, into the external environment, e.g., the side wall space 310 of the body 305 of the vehicle 105.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
 a vehicle compartment defining an interior volume of a vehicle, the vehicle compartment to enclose the interior volume from an external environment, and the interior volume of the vehicle at least partially disposed beneath a floor of a truck bed of the vehicle;

a snorkel in fluid communication with the interior volume of the vehicle compartment and with the external environment;

the snorkel integrated into a first segment of the truck bed of the vehicle such that the snorkel extends beneath the floor of the truck bed to a side wall space of the truck bed; and the snorkel in fluid communication with the side wall space of the truck bed.

2. The apparatus of claim 1, comprising:

the vehicle compartment including an interior wall;

the snorkel including a first end and a second end;

the first end fluidly coupled with the interior wall of the vehicle compartment and in fluid communication with the interior volume of the vehicle compartment, the interior volume of the vehicle compartment having a first pressure; and the second end exposed to the external environment, the external environment having a second pressure less than the first pressure.

3. The apparatus of claim 1, comprising:

the snorkel including:
 a first end in fluid communication with the interior volume of the vehicle compartment; and
 a second end flush with the side wall space of the truck bed.

4. The apparatus of claim 1, wherein the vehicle compartment comprises the snorkel, the snorkel comprises:
 a first end in fluid communication with the interior volume of the vehicle compartment; and
 a second end in fluid communication with the external environment.

5. The apparatus of claim 1, wherein the vehicle compartment comprises a storage compartment, the storage compartment including contours to receive a tire.

6. The apparatus of claim 1, wherein the vehicle compartment comprises:
 a door to actuate between a first position and a second position.

7. The apparatus of claim 1, wherein the vehicle compartment comprises:
 a door to actuate between a first position and a second position; and
 the snorkel to extract air from the interior volume of the vehicle compartment responsive to the door actuating from the first position to the second position.

8. The apparatus of claim 1, wherein the snorkel comprises:
 an egress air channel including:
  a first portion in fluid communication with a second portion; and
  the second portion curved and in fluid communication with a straight egress portion.

9. The apparatus of claim 1, comprising:
 the snorkel including a one-way pressure valve to allow unidirectional fluid flow from the vehicle compartment to the external environment.

10. The apparatus of claim 1, comprising:
 the vehicle compartment including an interior wall; and
 the snorkel including a first end fluidly coupled with the interior wall of the vehicle compartment and in fluid communication with the interior volume of the vehicle compartment;
 wherein the snorkel is flush with the interior wall of the vehicle compartment.

11. The apparatus of claim 1, wherein the snorkel has a diameter greater than or equal to about 80 millimeters and less than or equal to about 90 millimeters.

12. The apparatus of claim 1, wherein the vehicle compartment is configured to enclose the interior volume from exposure to a fluid.

13. A vehicle, comprising:
 a vehicle compartment defining an interior volume of the vehicle, the vehicle compartment to enclose the interior volume from an external environment, and the interior volume of the vehicle at least partially disposed beneath a floor of a truck bed of the vehicle;
 a snorkel fluidly coupled with the vehicle compartment, the snorkel in fluid communication with the interior volume of the vehicle compartment and with the external environment;
 the snorkel integrated into a first segment of the truck bed of the vehicle such that the snorkel extends beneath the floor of the truck bed to a side wall space of the truck bed; and
 the snorkel in fluid communication with the side wall space of the truck bed.

14. The vehicle of claim 13, wherein the vehicle compartment comprises the snorkel, the snorkel comprises:
 a first end in fluid communication with the interior volume of the vehicle compartment; and
 a second end in fluid communication with the external environment.

15. The vehicle of claim 13, comprising:
 the vehicle compartment including an interior wall;
 the snorkel including a first end and a second end;
 the first end fluidly coupled with the interior wall of the vehicle compartment and in fluid communication with the interior volume of the vehicle compartment, the interior volume of the vehicle compartment having a first pressure; and
 the second end exposed to the external environment, the external environment having a second pressure less than the first pressure.

16. The vehicle of claim 13, wherein the vehicle compartment comprises:
 a door to actuate between a first position and a second position; and
 the snorkel to extract air from the interior volume of the vehicle compartment responsive to the door actuating from the first position to the second position.

17. A method, comprising:
 providing a vehicle compartment defining an interior volume of a vehicle;
 enclosing the interior volume of the vehicle compartment from an external environment, the interior volume of the vehicle at least partially disposed beneath a floor of a truck bed of the vehicle;
 coupling a snorkel with the vehicle compartment, the snorkel in fluid communication with the interior volume of the vehicle compartment and with the external environment; and
 integrating the snorkel into a first segment of the truck bed of the vehicle such that the snorkel extends beneath the floor of the truck bed to a side wall space of the truck bed, and the snorkel in fluid communication with the side wall space of the truck bed.

18. The method of claim 17, comprising:
 extracting air from the interior volume of the vehicle compartment via the snorkel.

\* \* \* \* \*